US006307822B1

United States Patent
Shim et al.

(10) Patent No.: US 6,307,822 B1
(45) Date of Patent: *Oct. 23, 2001

(54) DATA REPRODUCTION APPARATUS FOR OPTICAL DISC SYSTEM

(75) Inventors: Jae-Seong Shim, Seoul; Yong-Kwang Won, Kyungki-do; Hyun-Soo Park; Il-Kwan Kim, both of Seoul, all of (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,155

(22) Filed: Nov. 18, 1999

(30) Foreign Application Priority Data

Nov. 18, 1998 (KR) .................................................. 98-49542

(51) Int. Cl.[7] ........................................................ G11B 5/09
(52) U.S. Cl. ..................................... 369/47.18; 369/59.21; 360/32
(58) Field of Search ................................ 369/47, 48, 54, 369/60.01, 59, 124.01, 124.05, 47.15, 47.17, 47.18, 47.35, 53.12, 53.15, 53.16, 53.32, 53.43, 59.21; 360/27, 32

(56) References Cited

U.S. PATENT DOCUMENTS 5,333,126 * 7/1994 Fukuda et al. ......................... 369/59
5,721,548  2/1998 Choe et al. .
5,737,371 * 4/1998 Jaquette ............................. 369/59 X

OTHER PUBLICATIONS

M. Tobita et al.; "Viterbi Detection of Partial Response on a Magneto–Optical Recording Channel"; 1992; vol. 1663, pp. 166–173.
Patent Abstracts of Japan; Japanese Publication No. 10106160, published Apr. 24, 1998.

* cited by examiner

Primary Examiner—Paul W. Huber
(74) Attorney, Agent, or Firm—Staas & Halsey LLP

(57) ABSTRACT

A data reproduction apparatus for an optical disc system is provided. Included is an analog-to-digital converter (ADC) for sampling an input RF signal and outputting the sampled result, an adder for adding the sampled signal and an asymmetry correction signal. The added signal is output. A blank/defect detector is provided for generating a blank detection signal if no change in data is detected from the added signal during a predetermined interval of time. A correction signal generator is provided for calculating a digital sum value (DSV) from the received added signal, generating an asymmetry correction signal based on the calculated DSV, and outputting the generated asymmetry correction signal to the adder. A waveform equalizer is provided for waveform-equalizing the added signal. A decoder is provided for decoding the waveform-equalized signal and outputting the result. The correction signal corrector temporarily stops a DSV calculation operation with respect to the interval of the corresponding added signal, if the blank detection signal is output. Thus, an asymmetry of the RF signal is corrected to enhance quality of the reproduced data.

44 Claims, 7 Drawing Sheets

DATA REPRODUCTION APPARATUS FOR OPTICAL DISC SYSTEM

CROSS-REFERENCE TO RELATED APPLICATIONS

This application claims the benefit of Korean Application No. 98-49542, filed Nov. 18, 1998, in the Korean Patent Office, the disclosure of which is incorporated herein by reference.

BACKGROUND OF THE INVENTION

1. Field of the Invention

The present invention relates to a data reproduction apparatus for an optical disc system.

2. Description of the Related Art

FIG. 1 is a block diagram showing a data reproduction apparatus for a conventional optical disc system. In the FIG. 1 apparatus, a radio frequency (RF) signal read from an optical disc is input to an analog-to-digital converter (ADC) 11 and a binarization circuit 14. The binarization circuit 14 binarizes the RF signal and outputs the binarization signal to a phase locked loop (PLL) 15. The PLL 15 receives the binarization signal and generates a clock signal PLCK synchronized with the RF signal. The clock signal PLCK is supplied to the ADC 11, a waveform equalizer 12 and a Viterbi decoder 13. The ADC 11 converts the input analog RF signal into a digital RF signal and outputs the digital RF signal to the waveform equalizer 12. The waveform equalizer 12 receives the digital RF signal and waveform-equalizes the received digital RF signal into a form which is appropriate for the Viterbi decoder 13. The Viterbi decoder 13 receives the waveform equalized signal to then be Viterbi decoded and outputs the result as a reproduction signal (VITO). The Viterbi decoding can restore the damaged signal when the RF signal is damaged due to noise interference in a channel, such as that which is widely used in a hard disc drive (HDD).

However, if in the input RF signal in the conventional data reproduction apparatus is asymmetrical, the Viterbi decoder does not restore the RF signal, thereby degenerating the quality of the reproduced data.

SUMMARY OF THE INVENTION

To solve the above problems, it is an object of the present invention to provide a data reproduction apparatus for an optical disc system which corrects asymmetry of an RF signal to improve the quality of the reproduced data.

Additional objects and advantages of the invention will be set forth in part in the description which follows and, in part, will be obvious from the description, or may be learned by practice of the invention.

To accomplish the object of the present invention, a data reproduction apparatus is provided for an optical disc system in which a radio frequency (RF) signal detected from an optical recording medium is decoded to reproduce data, the data reproduction apparatus comprising: an analog-to-digital converter (ADC) for sampling the input RF signal and outputting the sampled result; an adder for adding the sampled signal and an asymmetry correction signal and outputting the added signal; a blank/defect detector for generating a blank detection signal if no change in data is detected from the added signal during a predetermined interval of time; a correction signal generator for calculating a digital sum value (DSV) from the received added signal, generating an asymmetry correction signal based on the calculated DSV, and outputting the generated asymmetry correction signal to the adder; a waveform equalizer for waveform-equalizing the added signal; and a decoder for decoding the waveform-equalized signal and outputting the result. Here, if a blank detection signal is output, the correction signal corrector temporarily stops a DSV calculation operation with respect to the interval of the corresponding added signal.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE PREFERRED EMBODIMENTS

Figure 1:
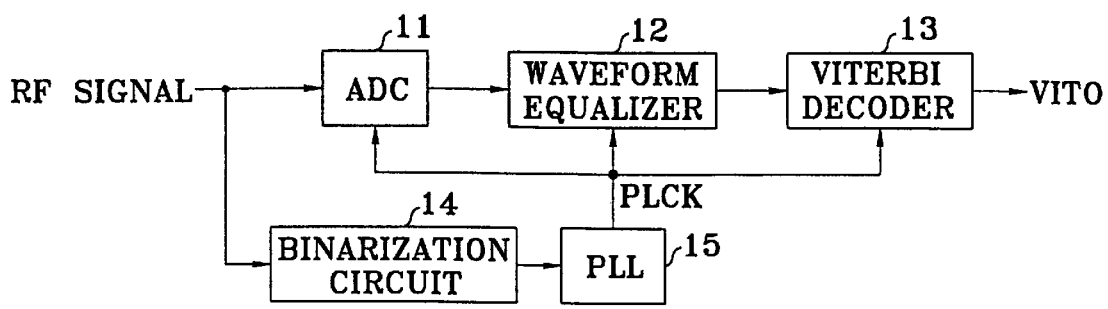
FIG. 1 is a block diagram showing a data reproduction apparatus for a conventional optical disc system.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
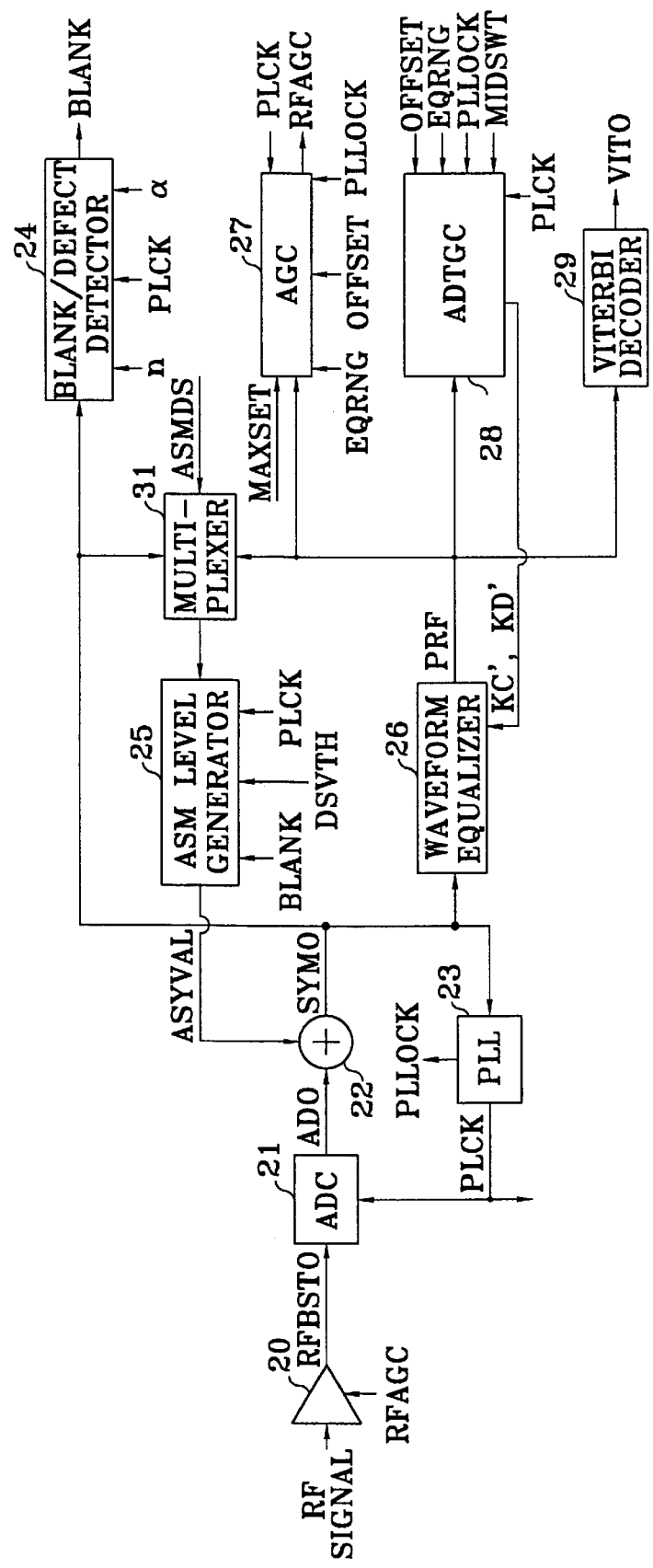
FIG. 2 is a block diagram showing a data reproduction apparatus for an optical disc system according to one embodiment of the present invention.

In FIG. 2, a booster amplifier 20 receives an RF signal detected from an optical disc, generates an amplification signal RFBSTO and outputs the same to an analog-to-digital converter (ADC) 21. The ADC 21 generates a digital signal ADO and outputs the same to the first input port of an adder 22. The adder 22 adds the signal input via the first input port and an asymmetry correction signal ASYVAL input via the second input port, and outputs the added result SYMO to a phase locked loop (PLL) 23, a blank/defect detector 24, a waveform equalizer 26 and a multiplexer 31. The PLL 23 generates a clock signal PLCK and supplies the clock signal PLCK to the ADC 21 and other circuits which are described below. The blank/defect detector 24 receives the SYMO signal and generates the blank/defect detection signal BLANK to be supplied to the ASM level generator 25. The waveform equalizer 26 receives the SYMO signal and generates the waveform equalized signal PRF to be output to an automatic gain control (AGC) unit 27, an adaptive Tmin gain control (ADTGC) unit 28, a Viterbi decoder 29 and a multiplexer 31. The multiplexer 31 receives the SYMO signal and the PRF signal and outputs one of these received signals to the ASM level generator 25 according to a select signal ASMDS. The ASM level generator 25 receives the output of the multiplexer 31 and generates the ASYVAL signal to be output to the second input port of the adder 22. The AGC 27 receives the PRF signal and generates a gain control signal RFAGC to be supplied to the booster amplifier 20. The ADTGC unit 28 receives the PRF signal and generates filter coefficients KC' and KD' to be supplied to the waveform equalizer 26. The Viterbi decoder 29 receives the PRF signal and outputs the reproduction signal VITO.

Figure 3:
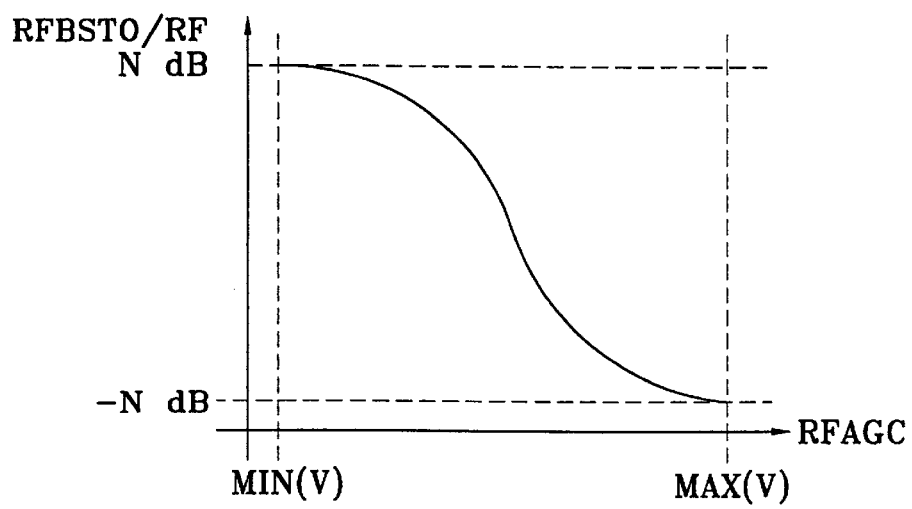
FIG. 3 is a graphical view showing a gain variation characteristic of the booster amplifier of FIG. 2.

The operation of the FIG. 2 apparatus having the above configuration will be described below with reference to FIGS. 3 and 7.

In FIG. 2, the RF signal detected from the optical disc is input to the booster amplifier 20. The booster amplifier 20 has a gain variation characteristic as shown in FIG. 3, and amplifies the RF signal according to the RFAGC signal supplied from the AGC unit 27, to be described later. However, at the initial time of operation in the FIG. 2 apparatus, the input signal is amplified at an amplification rate set to an initial value. The ADC 21 receives the amplified RF signal RFBSTO, converts the same into a digital signal ADO, and outputs the digital signal ADO to the first input port of the adder 22. The adder 22 adds the ADO signal and the asymmetry correction signal ASYVAL, which is input via the second input port. At the initial time of operation in the FIG. 2 apparatus, the ASYVAL value is set to "0" and the ADO signal is output as the added signal SYMO. The blank/defect detector 24 detects an interval where no data is recorded, or data is damaged due to a defect on a disc, from the received SYMO signal in such a manner that an asymmetry level can be accurately detected in the ASM level generator 25.

Figure 4:
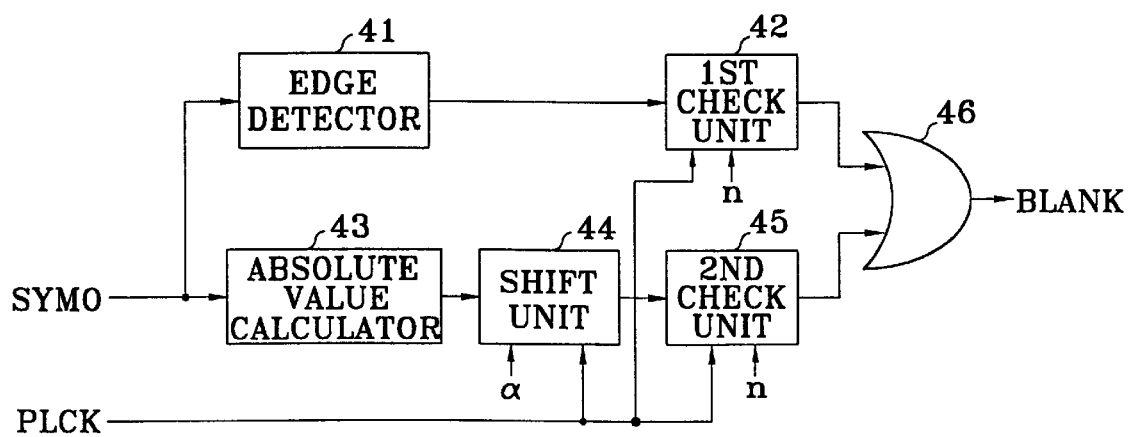
FIG. 4 is a detailed circuit diagram of the blank/defect detector of FIG. 2.

The detailed configuration and operation of the blank/defect detector 24 will be described below with reference to FIG. 4. The SYMO signal output from the adder 22 is input to an edge detector 41 and an absolute value calculator 43 in the blank/defect detector 24. The edge detector 41 detects an edge from the input SYMO signal and applies an edge detection signal to a first check unit 42. The first check unit 42 checks the length of a sign bit from the point in time when one edge detection signal is output until the following edge detection signal is output. The first check unit 42 generates a first check signal, to be output to an OR gate 46, indicating that no variation exists in the input signal for an interval nT when an edge is not detected for the interval nT. Here, T denotes a period of clock PLCK and n is an integer. The absolute value calculator 43 calculates an absolute value of the SYMO signal to be output to a shift unit 44. The shift unit 44 shifts the absolute value of the SYMO signal to the right by a set value supplied from a controller (not shown). A second check unit 45 checks whether a value of zero is sequentially input from the shift unit 44. If a value of zero is sequentially input for the interval nT, the second check unit 45 generates a second check signal, to be output to the OR gate 46, indicating that data greater than a predetermined value does not exist for the interval nT. The OR gate 46 logically sums the outputs of the check units 42 and 45 and outputs the result. That is, if any one of the first or second check signals is output, the OR gate 46 generates a blank/defect detection signal BLANK indicating that no data has been recorded or that data has been lost.

Referring back to FIG. 2, the waveform equalizer 26 receives the SYMO signal to perform a waveform equalization operation. The waveform equalizer 26 utilizes filter coefficient values set to initial values at the initial time of operation. The multiplexer 31 selects either the SYMO signal or the waveform equalized signal PRF output from the waveform equalizer 26 according to the selection signal ASMDS and outputs the selected result to the ASM level generator 25. The ASM level generator 25 receives the output of the multiplexer 31 and detects an asymmetry level of the received signal.

Figure 5:
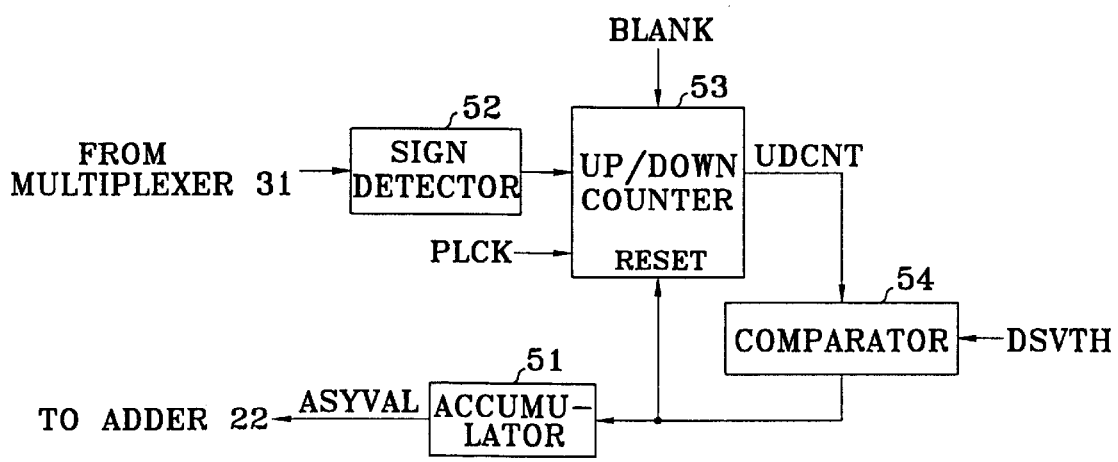
FIG. 5 is a detailed circuit diagram of the ASM level generator of FIG. 2.

FIG. 5 is a detailed circuit diagram of the ASM level generator of FIG. 2. A sign detector 52 in the ASM level generator 25 detects a sign of the signal input from the multiplexer 31 and outputs the detected result to an up/down counter 53. The up/down counter 53 performs an up-counting operation when a sign detected in the sign detector 52 is positive (+) and a down-counting operation when the sign is negative (−). If the BLANK signal is output from the blank/defect detector 24, the counting operation is stopped since reliability with respect to the input data is lowered. The count value UDCNT of the up/down counter 53 is a digital sum value DSV with respect to the input data. As the DSV increases, the asymmetry of the input signal increases. A comparator 54 obtains an absolute value of the UDCNT and compares the obtained absolute value with a predetermined DSV threshold value DSVTH. The comparator 54 generates a determination resultant signal indicating that the absolute value of the UDCNT is larger than the DSVTH, if it is determined that the former is larger than the latter, and then outputs the determination resultant signal to an accumulator 51 and a reset of the up/down counter 53.

The accumulator 51 generates the ASYVAL value based on the UDCNT value if the determination resultant signal indicating the absolute value of the UDCNT is larger than the DSVTH is output. In more detail, when a sign of the UDCNT is positive, the ASYVAL value having a negative sign and a value proportional to the absolute value of the UDCNT is generated. Meanwhile, when a sign of the UDCNT is negative, the ASYVAL value having a positive sign and a value proportional to the absolute value of the UDCNT is generated. The ASYVAL value is output to the second input port of the adder 22 of FIG. 2. The adder 22 adds the ASYVAL value to the current input signal input via the first input port, to thereby continuously output the asymmetry corrected signal.

Meanwhile, the ADTGC 28 extracts data corresponding to a 3T level which is an intermediate value of the data used in the Viterbi decoder 29 among the data input to the Viterbi decoder 29 and checks whether the extracted level is appropriate.

Figure 6:
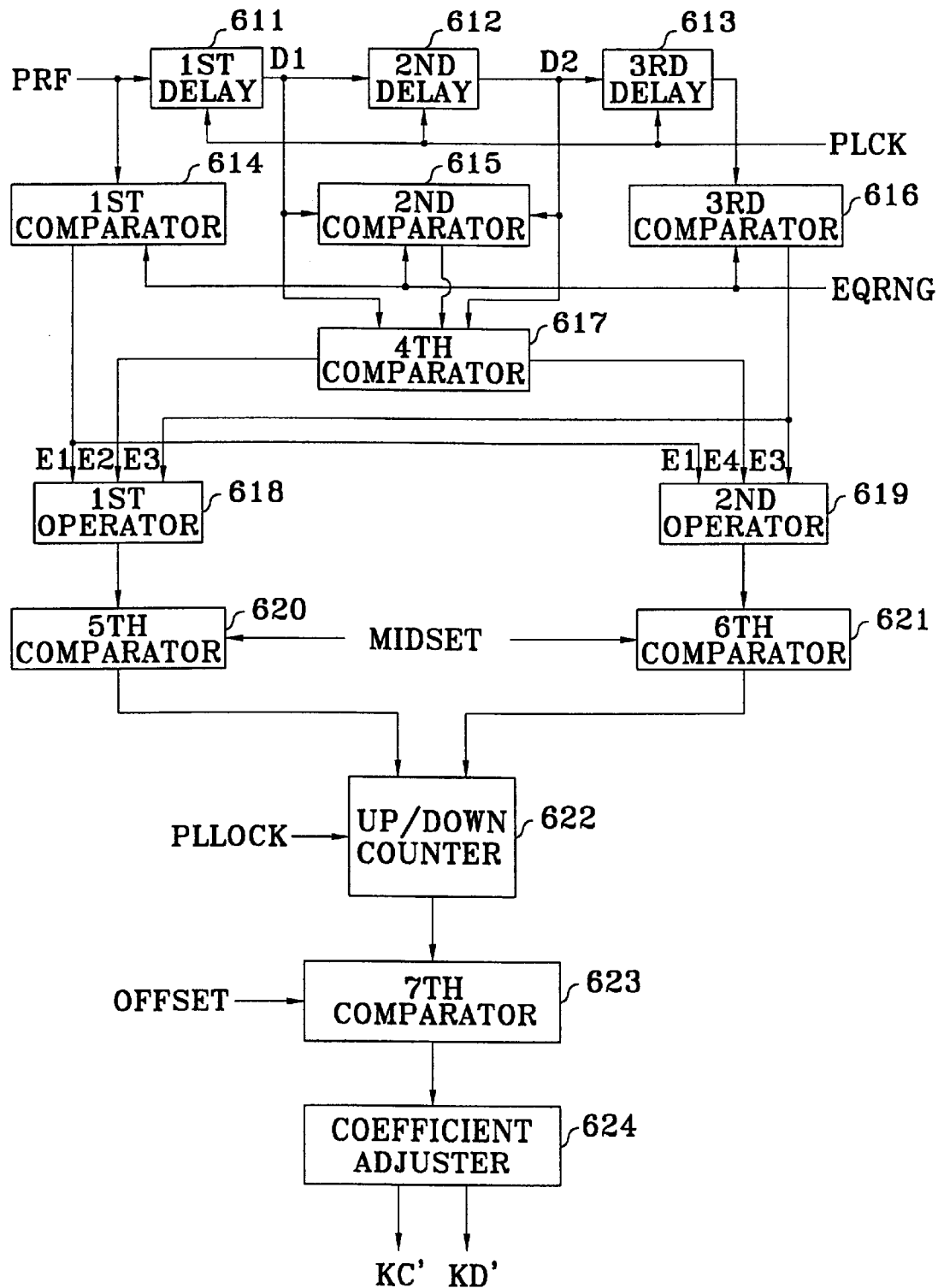
FIG. 6 is a detailed circuit diagram of the ADTGC unit of FIG. 2.

In FIG. 6, showing a detailed circuit diagram of the ADTGC unit 28 of FIG. 2, delays 611–613 and comparators 614–617 extract a signal corresponding to 3T from the PRF signal. The delays 611–613, which are connected in series, delay the waveform equalized signal PRF in sequence by one period of the clock signal PLCK, respectively. The comparator 614 obtains the absolute value of the input PRF signal and compares the obtained absolute value with a reference value EQRNG for detecting a 3T signal. The comparator 614 judges that the input signal is a 3T signal if the absolute value of the PRF is smaller than EQRNG, to thus generate a first enable signal E1. The first enable signal E1 is output to operators 618 and 619. The comparator 615 receives delay signals D1 and D2, output from the delays 611 and 612, respectively, and obtains an absolute value of the difference between the values of the delay signals D1 and D2. Also, the obtained absolute value is compared with EQRNG. If the former is smaller than the latter, it is judged that the delay signals D1 and D2 are signals having similar levels, respectively. This means that the input data is synchronized with the PLL 23. The second comparator 615 outputs a determination resultant signal to the fourth comparator 617. The fourth comparator 617 receives the determination resultant signal from the second comparator 615 and the delay signals D1 and D2 from the delays 611 and 612 and compares the delay signals D1 and D2 with the EQRNG signal, respectively. Due to the result of the comparison, when the delay signals D1 and D2 are larger than the EQRNG signal, it is determined that the delay signals D1 and D2 are signals having a value larger than an appropriate level which is not close to a zero value, respectively, to thereby output a second enable signal E2 to the operator 618. In the mean time, when the delay signals D1 and D2 are smaller than the EQRNG signal, it is determined that the delay signals D1 and D2 are signals having a value smaller than an appropriate level which is not close to a zero value, respectively, to thereby output a fourth enable signal E4 to the operator 619. The comparator 616 obtains the absolute value of the delay signal D3, output from the delay 613, and compares the obtained absolute value with EQRNG. In the comparison result, if the absolute value of the delay signal D3 is smaller than EQRNG, a third enable signal E3 is generated to be output to the operators 618 and 619. The operators 618 and 619 become enabled when all of the enable signals E1, E2 (or E4), and E3 are output. Here, if the enable signals E1, E2 and E3 are output, the input data indicates a −3T signal synchronized with the clock. If the enable signals E1, E4 and E3 are output, the input data indicates a −3T signal synchronized with the clock. If that the operator 618 is enabled, the operator 618 adds the delay signals D1 and D2 with respect to the +3T signal, and outputs the result to a comparator 620. If the operator 619 is enabled, the operator 619 adds the delay signals D1 and D2 with respect to the −3T signal, and outputs the result to a comparator 621. The comparator 620 compares the added result output from the operator 618 with a standard intermediate value (MIDSET) corresponding to the 3T level at an operational initial time of the Viterbi decoder 29, and outputs the comparison result to an up/down counter 622. Likewise, the comparator 621 compares the added result output from the operator 619 with the MIDSET, and outputs the comparison result to the up/down counter 622. When a comparison result indicating that D1+D2 is larger than the MIDSET is output from the comparator 620 or the comparator 621, the up/down counter 622 performs an up-counting operation. Alternately, when a comparison result indicating that D1+D2 is smaller than the MIDSET is output, the up/down counter 622 performs a down-counting operation. The count value of the up/down counter 622 is output to a comparator 623. The comparator 623 compares the count value with an externally supplied offset value OFFSET. If the count value exceeds the offset value, a signal indicating same is output to a coefficient adjuster 624. The coefficient adjuster 624 adjusts the filter coefficient values KC' and KD' of the waveform equalizer 26 if a comparison resultant signal indicating that the count value exceeds the OFFSET value is output. The up/down counter 622 in the ADTGC 28 stops a count operation and stabilizes the operation of the circuit, if a clock synchronization signal PLLOCK output from the PLL 23 indicates that data is not synchronized with the clock.

Meanwhile, the AGC unit 27 extracts data corresponding to a 4T level, which is a maximum value of data used in the Viterbi decoder 29 among the data input to the Viterbi decoder 29 and checks whether the level of the extracted data is appropriate to maintain the gain of the booster amplifier 20 to an appropriate value.

Figure 7:
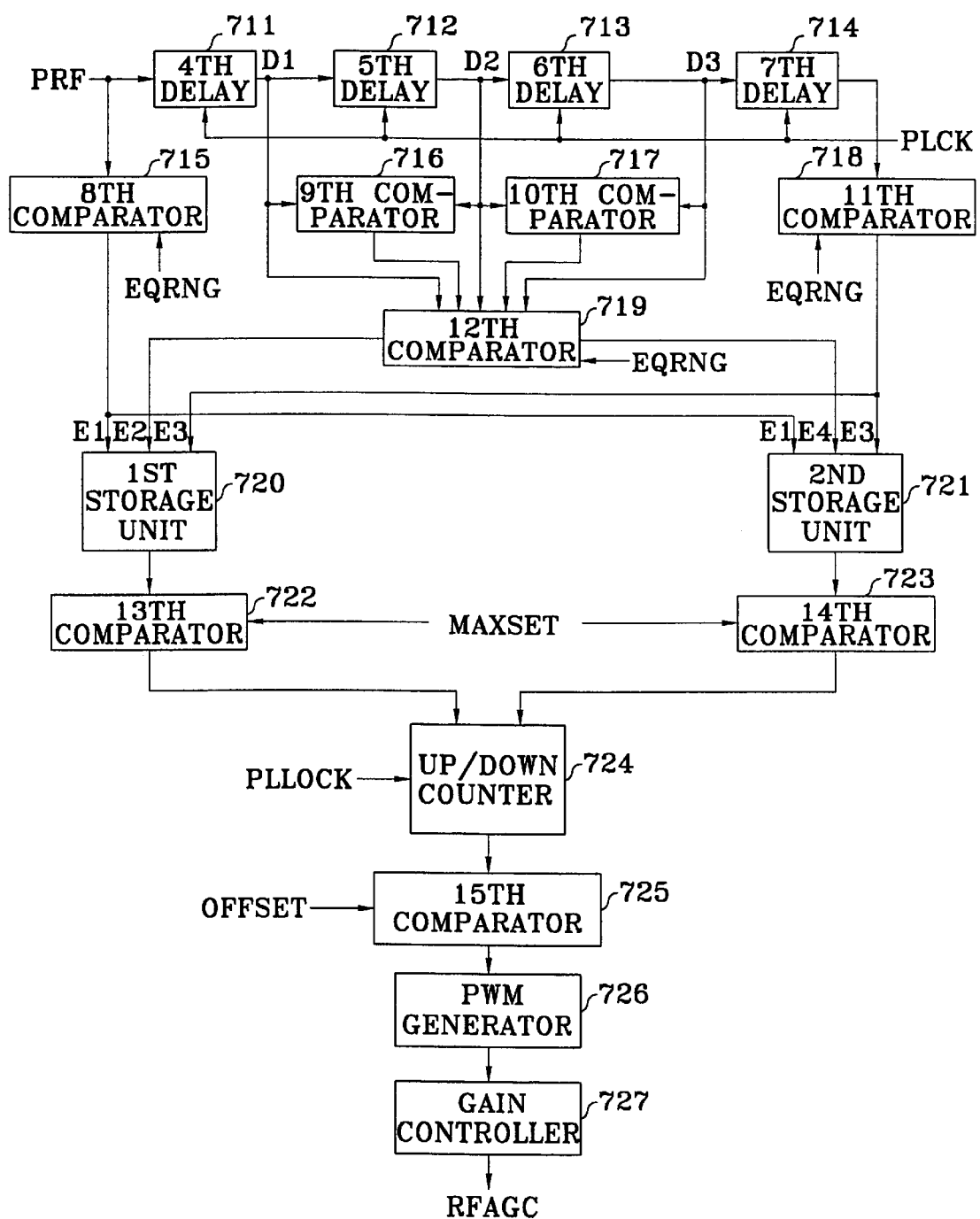
FIG. 7 is a detailed circuit diagram of the AGC unit of FIG. 2.

FIG. 7 shows a detailed circuit diagram of the AGC unit 27 of FIG. 2, in which delays 711–714 and comparators 715–719 extract a signal corresponding to 4T from the input PRF signal. The delays 711–714, which are connected in series, delay the input PRF signal in sequence with one period of the clock signal PLCK, respectively. The comparator 715 detects a 4T level signal by using a reference signal EQRNG for detecting a 4T level. The comparator 715 generates a first enable signal E1 when a 4T level signal is detected, which is then output to storage units 720 and 721. Also, the comparator 718 detects a 4T level signal from the delay signal D4. The comparator 718 generates a third enable signal E3 when a 4T level signal is detected, which is then output to the storage units 720 and 721. The comparator 716 outputs, to the comparator 719, a comparison resultant signal indicating that D1 is smaller than D2. The comparator 717 outputs, to the comparator 719, a comparison resultant signal indicating that D2 is larger than D3. The comparator 719 receives the comparison resultant signals of the comparators 716 and 717 and outputs a second enable signal E2 to the first storage device 720 only when D1, D2 and D3 are all larger than EQRNG. When D1, D2 and D3 are all smaller than EQRNG, a fourth enable signal E4 is output to the storage device 721. The storage devices 720 and 721 become enabled only when all of the enable signals E1, E2 (or E4) and E3 are output. The storage device 720 stores a D2 value with respect to the +4T signal and reads the stored value to output the same to a comparator 722. If the storage device 721 is enabled, the storage device 721 stores a D2 value with respect to the −4T signal and reads the stored value to output the read result to a comparator 723. The comparator 722 compares D2 of the +4T signal with an externally supplied standard maximum value MAXSET, corresponding to a 4T level at the initial time of operation in the Viterbi decoder 29, and outputs the comparison result to an up/down counter 724. The comparator 723 compares D2 of the −4T signal with the MAXSET and outputs the comparison result to the up/down counter 724. If D2 is larger than the MAXSET, the up/down counter 724 performs an up-counting operation, and if D2 is smaller than the MAXSET, the up/down counter 724 performs a down-counting operation. The count value of the up/down counter 724 is output to a comparator 725. The comparator 725 compares the count value with an externally supplied offset value OFFSET. When the count value exceeds the OFFSET value, a PWM generator 726 and a gain controller 727 generate a gain control signal RFAGC for controlling a gain of the booster amplifier 20 and supply the generated result to the booster amplifier 20. The up/down counter 724 of the AGC unit 27 also stops the counting operation and stabilizes the circuitry operation, if a clock synchronization signal PLLOCK output from the PLL 23 indicates that data is not clock-synchronized.

Referring back to FIG. 2, the Viterbi decoder 29 Viterbi-decodes the PRF signal and outputs the Viterbi-decoded signal as a reproduced signal VITO.

Figure 8:
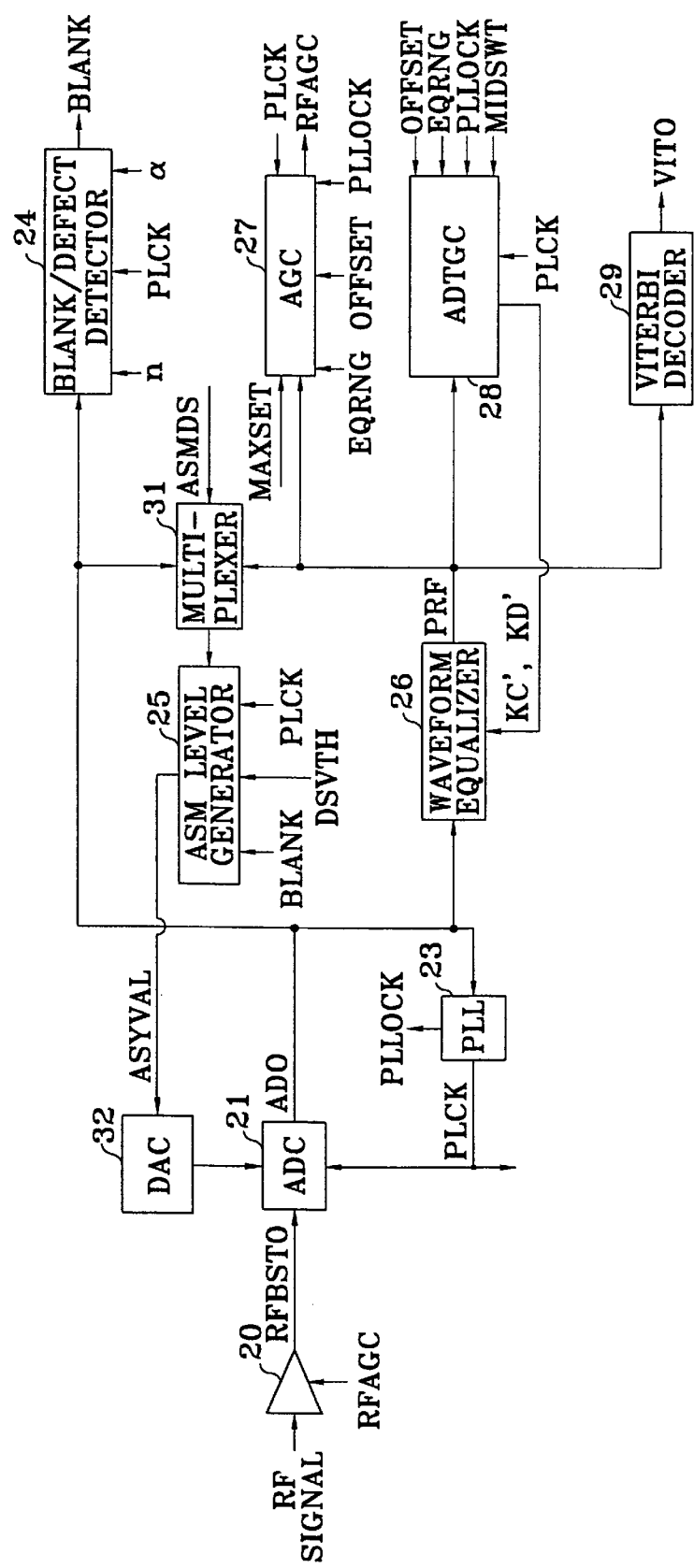
FIG. 8 is a block diagram showing a data reproduction apparatus for an optical disc system according to another embodiment of the present invention.

FIG. 8 is a block diagram showing a data reproduction apparatus for an optical disc system according to another embodiment of the present invention. The FIG. 8 apparatus includes a digital-to-analog converter (DAC) 32 for digital-to-analog conversion of the output of the ASM level generator 25 and outputting the result to the ADC 21, instead of the adder 22 of FIG. 2. Except for this difference, the FIG. 8 apparatus is same as the FIG. 2 apparatus. In FIG. 8, the blocks performing the same functions as those of FIG. 2 are assigned same reference numerals as those of FIG. 2. Thus, the detailed description thereof will be omitted. The DAC 32 converts the digital ASYVAL value into an analog value and applies the result to the ADC 21 as a reference voltage. As a result, the signal output from the ADC 21 becomes the asymmetry corrected data.

As described above, the present invention corrects asymmetry of the RF signal to thereby improve performance of the Viterbi decoder. As a result, quality of the reproduced data can be improved.

What is claimed is:

1. An apparatus to correct an asymmetrical signal, comprising:
   an adder which adds an asymmetrical correction signal to a digitally sampled input signal;
   a blank detection signal generator which generates a blank detection signal if there is no change in the added signal over a predetermined interval of time; and
   a correction signal generator which calculates a digital sum value for the added signal and generates an asymmetrical correction signal, based on the digital sum value, and outputs the asymmetrical correction signal to said adder, wherein if the blank detection signal is output, a calculation of a digital sum value is stopped for the predetermined interval of time.

2. The apparatus as claimed in claim 1, further comprising:
   a wave form equalizer which waveform equalizes the added signal; and
   a decoder which decodes the waveform-equalized signal and outputs the result.

3. The apparatus as claimed in claim 1, further comprising:
   a wave form equalizer which waveform-equalizes the added signal; and
   a decoder which decodes the waveform-equalized signal and outputs the result, wherein said blank detection signal generator generates the blank detection signal if the blank detection signal generator does not detect an edge over a predetermined interval of time or a signal having at least a predetermined level.

4. The apparatus as claimed in claim 2, further comprising a multiplexer which selectively supplies the added signal and the waveform-equalized signal to said correction signal generator based on an externally supplied select signal.

5. The apparatus of 1, further comprising an analog to digital converter which converts an analog input RF signal to the digitally sampled input signal.

6. The apparatus as claimed in claim 5, further comprising:
   an up/down counter which up-counts the input RF signal when a sign of the input RF signal is positive and down-counts when a sign of the input RF signal is negative and obtains a counted value;
   a comparator which obtains an absolute value of the counted value, compares the absolute value with a threshold value and outputs a first comparison resultant signal if the absolute value is greater than the threshold value; and
   an operator which generates an asymmetry correction signal having a sign which is different than a sign of the counted value if the first comparison resultant signal is output, wherein said up/down counter stops counting during an interval of time when the blank detection signal is generated by said blank detection signal generator.

7. The apparatus as claimed in claim 1, wherein said blank detection signal generator further comprises:
   an edge detector which receives the added signal and outputs first and second edge detection signals in response to detecting first and second edges of the added signal; and
   a check unit which receives the first and second edge detection signals and outputs the blank detection signal in response to the second edge detection signal not being received within an interval of an integer multiple of a clock period after the first edge detection signal is received.

8. The apparatus as claimed in claim 1, wherein said blank detector further comprises:
   an absolute value calculator which receives the added signal and outputs an absolute value of the added signal;
   a shift register which receives the absolute value and outputs sequential values; and
   a check unit which receives first and second values of said sequential values and outputs the blank detection signal in response to both said first and second sequential values being equal to zero.

9. The apparatus as claimed in claim 4, wherein said correction signal generator further comprises:
   a sign detector which receives the selected signal and detects a sign of the selected signal;
   an up/down counter which increases a counted value in response to the detected sign indicating a positive value and decreases the counted value in response to the detected sign indicating a negative value;
   a comparator which compares the counted value with a threshold value and outputs a determination result signal; and
   an accumulator which receives the determination result signal and outputs the asymmetrical correction signal based on the determination result.

10. The apparatus as claimed in claim 9, wherein said up/down counter further comprises an stop circuit which receives the blank detection signal and temporarily stops the up/down count in response to the blank detection signal being received.

11. The apparatus as claimed in claim 9, wherein if the counted value is positive, the asymmetrical signal is generated having a value proportional to an absolute value of the counted value and having a negative sign.

12. The apparatus as claimed in claim 9, wherein if the counted value is negative, the asymmetrical signal is generated having a value proportional to an absolute value of the counted value and having a positive sign.

13. An apparatus to correct an asymmetrical signal, comprising:
   a digital to analog converter which converts a digital asymmetrical correction signal to an analog correction signal;
   an analog-to-digital converter which references an analog input RF signal to the analog correction signal and outputs a sampled digital signal;
   a blank detection signal generator which generates a blank detection signal if there is no change in the sampled digital signal over a predetermined interval of time; and
   a correction signal generator which calculates a digital sum value for the sampled digital signal and generates the digital asymmetrical correction signal, based on the digital sum value, and outputs the digital asymmetrical correction signal to said digital to analog converter, wherein if the blank detection signal is output, a calculation of a digital sum value is stopped for the predetermined interval of time.

14. The apparatus as claimed in claim 13, wherein said filter coefficient adjuster further comprises:

a sequential delay circuit which delays the waveform equalized signal, Q0, by first, second and third predetermined times and outputs first, second and third delayed signals, Q1, Q2 and Q3, respectively;

a first comparator circuit which outputs a first enable signal, Z1, in response to the absolute value of signal, Q0, being less than a first predetermined reference value;

a second comparator circuit which outputs a second enable signal, Z2, in response to each of signals, Q1 and Q2, being greater than the first predetermined reference value;

a third comparator circuit which outputs a third enable signal, Z3, in response to an absolute value of signal, Q3, being less than the first predetermined reference value;

a fourth comparator circuit which outputs a fourth enable signal, Z4, in response to each of signals, Q1 and Q2, being less than the first predetermined reference value;

a first operator circuit which adds signals, Q1 and Q2, and outputs a first sum of Q1 and Q2 in response to signals, Z1, Z2 and Z3, occurring coincidently a second operator circuit which adds signals, Q1 and Q2, and outputs a second sum of Q1 and Q2 in response to signals, Z1, Z3 and Z4, occurring coincidently; and an up/down counter which increases a counted value in response to the first sum of Q1 and Q2 exceeding a second predetermined reference value and decreases the counted value in response to the second sum of Q1 and Q2 exceeding the second predetermined reference value, wherein the filter coefficients of said waveform equalizer are adjusted in response to the counted value exceeding a third predetermined reference value.

15. The apparatus as claimed in claim 13 wherein said gain controller further comprises:

a sequential delay circuit which delays the waveform equalized signal, Q0, by first, second, third and fourth predetermined times and outputs first, second, third and fourth delayed signals, Q1, Q2, Q3, and Q4, respectively;

a first comparator circuit which generates a first enable signal, Z1, based on comparing signal, Q0, with a first predetermined reference value;

a second comparator circuit which generates a second enable signal, Z2, in response to each of signals, Q1, Q2 and Q3, being greater than the first predetermined reference value;

a third comparator circuit which generates a third enable signal, Z3, based on comparing signal Q4 with the first predetermined reference value;

a fourth comparator circuit which generates a fourth enable signal, Z4, in response to each of signals, Q1, Q2 and Q3, being less than the first predetermined reference value;

a first storage unit which stores and outputs a first value of Q2 in response to signals, Z1, Z2 and Z3, occurring coincidently;

a second storage unit which stores and outputs a second value of Q2 in response to signals, Z1, Z3 and Z4, occurring coincidently;

a fifth comparator circuit which compares the first output value of Q2 with a second predetermined reference value and outputs a first comparison result in response to the first output value of Q2 exceeding a second predetermined value;

a sixth comparator circuit which compares the second output value of Q2 with the second predetermined reference value and outputs a second comparison result in response to the second output value of Q2 exceeding the second predetermined value;

an up/down counter which increases a counted value in response to the first comparison result being received and which decreases the counted value in response to the second comparison result being received; and an adjusting circuit which alters the amplitude of the input RF signal in response to the counted value exceeding a third predetermined value.

16. A data reproduction apparatus comprising:

an analog-to-digital converter (ADC) which samples an input RF and outputs a sampled signal;

an adder which adds the sampled signal and an asymmetry correction signal and outputs an added signal;

a blank/defect detector which receives the added signal and generates a blank detection signal if no variation in the data is detected from the received added signal over a predetermined interval of time;

a correction signal generator which calculates a digital sum value (DSV) from the received added signal, generates the asymmetry correction signal based on the calculated DSV, and outputs the generated asymmetry correction signal to said adder;

a waveform equalizer which waveform-equalizes the added signal; and a decoder which decodes the waveform-equalized signal and outputs the result, wherein if said blank/defect detector generates the blank detection signal, said correction signal generator temporarily stops the DSV calculation of the correction signal generator with respect to an interval of the added signal.

17. The data reproduction apparatus as claimed in claim 16, wherein said decoder is a Viterbi decoder.

18. The data reproduction apparatus as claimed in claim 16, wherein said blank/defect detector generates the blank detection signal if said blank/defect detector does not detect an edge from the received added signal over the interval of time or a received added signal having at least a predetermined level.

19. The data reproduction apparatus as claimed in claim 16, wherein said correction signal generator receives the waveform equalized signal and calculates a DSV.

20. The data reproduction apparatus as claimed in claim 19, further comprising a multiplexer selectively supplying the added signal and the waveform equalized signal to said correction signal generator according to an externally supplied select signal.

21. The data reproduction apparatus as claimed in claim 20, wherein said correction signal generator comprises:

a sign detector which detects a sign of the input RF signal;

an up/down counter which up or down-counts the input RF signal according to the detected sign and outputs a counted value;

a comparator which obtains an absolute value of the counted value, compares the obtained absolute value with a predetermined threshold value, and outputs a first comparison resultant signal if the absolute value is larger than the threshold value; and an operator which generates an asymmetry correction signal having a sign which is different from that of the counted value if the first comparison resultant signal is output, wherein said up/down counter stops the counting operation during the time when the blank detection signal is generated by said blank/defect detector.

22. The data reproduction apparatus as claimed in claim 17, further comprising:
   a filter coefficient adjuster which receives the waveform equalized signal, extracts data corresponding to an intermediate level of the Viterbi decoder from the waveform equalized signal, checks a level of the extracted data, and updates filter coefficients of said waveform equalizer based on the checked result; and
   a gain controller which receives the waveform equalized signal, extracts data corresponding to a maximum level of the Viterbi decoder from the waveform equalized signal, checks a level of the extracted data, and controls a gain of the RF signal input to said ADC according to the checked level.

23. The data reproduction apparatus as claimed in claim 22, wherein the data corresponding to the intermediate level of the Viterbi decoder is a 3T level signal, and the maximum level is a 4T level signal, in which T is one period of a clock.

24. A data reproduction apparatus comprising:
   an analog-to-digital converter (ADC) which samples an input RF signal based on a reference voltage;
   a blank/defect detector which receives the sampled signal and generates a blank detection signal if a variation in data is not detected from the sampled signal over a predetermined interval of time;
   a correction signal generator which calculates a digital sum value (DSV) from the sampled signal, generates an asymmetry correction signal based on the calculated DSV, and outputs the generated asymmetry correction signal to said ADC as the reference voltage;
   a waveform equalizer which waveform-equalizes the sampled signal; and
   a decoder which decodes the waveform-equalized signal and outputs the result,
   wherein said correction signal generator temporarily stops the DSV calculation of said correction signal generator with respect to the interval of the corresponding sampled signal, if the blank/defect detector generates the detection signal.

25. A method for correcting an asymmetrical signal, comprising:
   adding an asymmetry correction signal to a digitally sampled input signal;
   generating a blank detection signal if there is no change in the added signal over a predetermined interval of time; and
   calculating a digital sum value for the added signal and outputting the asymmetry correction signal based on the digital sum value, wherein if the blank detection signal is output, calculating the digital sum value is stopped for the predetermined interval of time.

26. A method of reproducing data comprising:
   converting an input analog RF signal to a sampled digital signal;
   adding the sampled signal and an asymmetry correction signal and outputting an added signal;
   waveform-equalizing the added signal;
   selecting one of the added signal and the waveform equalized signal;
   calculating a digital sum value (DSV) based on the selected signal; and
   generating the asymmetry correction signal based on the calculated DSV.

27. The method of reproducing data as claimed in claim 26, further comprising:
   detecting a blank/defect in the added signal and stopping the calculating of the digital sum value if no variation in the data is detected in the added signal over a predetermined interval of time.

28. The method of reproducing data as claimed in claim 27, further comprising:
   decoding the waveform-equalized signal and outputting the result.

29. The method of reproducing data as claimed in claim 28, wherein said decoding is performed by a Viterbi decoder.

30. The method of reproducing data as claimed in claim 26, wherein the calculating of the digital sum value and the generating of the asymmetry correction signal comprise:
   detecting a sign of the selected signal;
   up or down-counting the selected signal according to the detected sign and outputting a counted value as the DSV;
   comparing an absolute value of the counted value with a predetermined threshold value, and outputting a first comparison resultant signal if the absolute value is larger than the threshold value; and
   outputting the asymmetry correction signal with a sign which is different from that of the counted value if the first comparison resultant signal is output.

31. The method of reproducing data as claimed in claim 29, further comprising:
   extracting first data corresponding to a Viterbi decoder intermediate level from the waveform equalized signal, checking a level of the first data, and altering the waveform equalized signal according to filter coefficients based on the checked level of the first data; and
   extracting second data corresponding to a Viterbi decoder maximum level from the waveform equalized signal, checking a level of the second data, and controlling an amplitude of the input analog RF signal input according to the checked level of the second data.

32. The method of reproducing data as claimed in claim 31, wherein the first data is a 3T level signal, and the second data is a 4T level signal, in which T is one period of a clock.

33. A method of reproducing data comprising:
   converting a digital asymmetry correction signal to an analog reference voltage;
   sampling an input RF signal referenced to the analog reference voltage and outputting a sampled digital signal;
   detecting blanks/defects in the sampled signal and generating a blank detection signal if a variation in data is not detected from the sampled signal over a predetermined interval of time; and
   calculating a digital sum value (DSV) from the sampled digital signal, generating the digital asymmetry correction signal based on the calculated DSV, and temporarily stopping the calculating of the DSV for the predetermined interval of time if the blank/defect detection signal is generated.

34. The method as claimed in claim 33, further comprising:
   waveform-equalizing the sampled digital signal; and
   decoding the waveform-equalized signal and outputting the result.

35. A method of correcting an asymmetrical signal, comprising:

adding an asymmetrical correction signal to a digitally sampled input signal, to generate an added signal;

generating a blank detection signal if there is no change in the added signal over a predetermined interval of time; and calculating a digital sum value for the added signal and generating an asymmetrical correction signal, based on the digital sum value, and temporarily stopping the calculating of the digital sum value for the predetermined interval of time if the blank detection signal is generated.

36. The method as claimed in claim 35, wherein the blank detection signal is generated if at least one of an edge of the added signal and the added signal having a minimum predetermined value is not detected over a predetermined interval of time.

37. The method as claimed in claim 35, further comprising:

waveform equalizing the added signal; and decoding the waveform-equalized signal and outputting the result.

38. A method of correcting an asymmetrical signal, comprising:

adding an asymmetrical correction signal to a digitally sampled input signal, to generate an added signal;

generating a blank detection signal if there is no change in the added signal over a predetermined interval of time;

waveform equalizing the added signal;

selecting one of the added signal and the waveform equalized signal;

calculating a digital sum value based on the selected signal, generating the asymmetrical correction signal based on the digital sum value, and temporarily stopping the calculating of the digital sum value for the predetermined interval of time if the blank detection signal is generated.

39. A method as claimed in claim 38, further comprising:

obtaining the digitally sampled input signal by converting an analog RF signal to digital form.

40. The method as claimed in claim 39, further comprising:

adjusting the analog RF signal based on comparing sequential values of the waveform equalized signal with a predetermined reference value.

41. The method as claimed in claim 38, further comprising:

adjusting the waveform equalized signal based on characteristics determined by comparing sequential values of the equalized signal with predetermined reference values.

42. The method as claimed in claim 38, further comprising:

obtaining the digitally sampled input signal by converting an analog RF signal to digital form;

adjusting the analog RF signal based on comparing a first set of sequential values of the waveform equalized signal with a first predetermined reference value; and adjusting the waveform equalized signal based on characteristics determined by comparing a second set of sequential values of the equalized signal with a second predetermined reference value.

43. The method as claimed in claim 42, wherein the adjusting of the analog RF signal comprises:

sequentially delaying the waveform equalized signal, Q0, by first, second, third and fourth predetermined times and outputting first, second, third and fourth delayed signals, Q1, Q2, Q3, and Q4, respectively;

generating a first enable signal, Z1, based on comparing signal, Q0, with the first predetermined reference value;

generating a second enable signal, Z2, in response to each of signals, Q1, Q2 and Q3, being greater than the first predetermined reference value;

generating a third enable signal, Z3, based on comparing signal, Q4, with the first predetermined reference value;

generating a fourth enable signal, Z4, in response to each of signals, Q1, Q2 and Q3, being less than the first predetermined reference value;

storing and outputting a first value of Q2 in response to signals, Z1, Z2 and Z3 occurring coincidently and storing and outputting a second value of Q2 in response to signals, Z1, Z3 and Z4, occurring coincidently;

increasing a counted value in response to the first value of Q2 exceeding a third predetermined reference value;

decreasing the counted value in response to the second value of Q2 exceeding the third predetermined reference value; and adjusting the analog RF signal based on comparing the counted value with a fourth predetermined reference value.

44. The method as claimed in claim 42, wherein the adjusting of the waveform equalized signal comprises:

sequentially delaying the waveform equalized signal, Q0, by first, second and third predetermined times and outputting first, second and third delayed signals, Q1, Q2 and Q3, respectively;

generating a first enable signal, Z1, in response to the absolute value of signal, Q0, being less than the second predetermined reference value;

generating a second enable signal, Z2, in response to each of signals, Q1 and Q2, being greater than the second predetermined reference value;

generating a third enable signal, Z3, in response to an absolute value of signal, Q3, being less than the second predetermined reference value;

generating a fourth enable signal, Z4, in response to each of signals, Q1 and Q2, being less than the second predetermined reference value;

adding signals, Q1 and Q2, and outputting a first sum of Q1 and Q2 in response to signals, Z1, Z2 and Z3, occurring coincidently and adding and outputting a second sum of Q1 and Q2 in response to signals, Z1, Z3 and Z4, occurring coincidently;

increasing a counted value in response to the first sum of Q1 and Q2 exceeding a third predetermined reference value;

decreasing the counted value in response to the second sum of Q1 and Q2 exceeding the third predetermined reference value; and adjusting the waveform equalized signal in response to the counted value exceeding a fourth predetermined reference value.

* * * * *

UNITED STATES PATENT AND TRADEMARK OFFICE
CERTIFICATE OF CORRECTION

PATENT NO. : 6,307,822 B1
DATED : October 23, 2001
INVENTOR(S) : Jae-Seong Shim et al.

It is certified that error appears in the above-identified patent and that said Letters Patent is hereby corrected as shown below:

<u>Column 8,</u>
Line 66, change "13" to -- 22 --;

<u>Column 9,</u>
Line 35, change "13" to -- 22 --.

Signed and Sealed this

Thirtieth Day of July, 2002

*Attest:*

*Attesting Officer*

JAMES E. ROGAN
*Director of the United States Patent and Trademark Office*